(12) United States Patent
Tian et al.

(10) Patent No.: US 12,114,027 B2
(45) Date of Patent: Oct. 8, 2024

(54) SELECTION OF CONTENT DELIVERY NETWORKS USING AGENTS

(71) Applicant: Beijing Hulu Software Technology Development Co., Ltd., Beijing (CN)

(72) Inventors: Chenyu Tian, Beijing (CN); Tongyu Dai, Beijing (CN); Si Chen, Beijing (CN); Lemei Huang, Beijing (CN)

(73) Assignee: BEIJING HULU SOFTWARE TECHNOLOGY DEVELOPMENT CO., LTD, Beijing (CN)

( * ) Notice: Subject to any disclaimer, the term of this patent is extended or adjusted under 35 U.S.C. 154(b) by 1 day.

(21) Appl. No.: 18/166,920

(22) Filed: Feb. 9, 2023

(65) Prior Publication Data

US 2024/0205473 A1    Jun. 20, 2024

(30) Foreign Application Priority Data

Dec. 19, 2022   (CN) .......................... 202211632854.2

(51) Int. Cl.
*H04N 21/24*   (2011.01)

(52) U.S. Cl.
CPC ..... *H04N 21/2402* (2013.01); *H04N 21/2401* (2013.01)

(58) Field of Classification Search
None
See application file for complete search history.

(56) References Cited

U.S. PATENT DOCUMENTS

| | | | |
|---|---|---|---|
| 5,646,676 A | 7/1997 | Dewkett et al. | |
| 5,684,963 A | 11/1997 | Clement | |
| 6,205,477 B1 | 3/2001 | Johnson et al. | |
| 6,591,383 B1 | 7/2003 | Michel et al. | |
| 7,742,485 B2 | 6/2010 | Zhang | |
| 7,895,445 B1 | 2/2011 | Albanese et al. | |

(Continued)

FOREIGN PATENT DOCUMENTS

| | | |
|---|---|---|
| CN | 103546477 A | 1/2014 |
| CN | 103368940 B | 4/2017 |

(Continued)

OTHER PUBLICATIONS

European Office Action, dated Jun. 13, 2023, Application No. 22150150.5, 2 pages.

(Continued)

*Primary Examiner* — Omar S Parra
(74) *Attorney, Agent, or Firm* — Kwan & Olynick LLP

(57) ABSTRACT

In some embodiments, a method determines an input value for a request for content and retrieves a plurality of states for a plurality of content delivery networks. The state includes a component that is based on variance. A plurality of scores for a plurality of content delivery networks is generated based on the input value and the plurality of states. A score for a content delivery network is generated using a parameter value for the component and the input value. The method selects a content delivery network from the plurality of content delivery networks based on the score for the content delivery network and outputs information for the selected content delivery network to cause the selected content delivery network to service the request to deliver the content.

20 Claims, 9 Drawing Sheets

(56) References Cited

U.S. PATENT DOCUMENTS

| | | |
|---|---|---|
| 8,117,306 B1 | 2/2012 | Baumback et al. |
| 8,169,916 B1 | 5/2012 | Pai et al. |
| 8,276,180 B1 | 9/2012 | Slavenburg et al. |
| 8,370,208 B1 | 2/2013 | Gupta et al. |
| 8,438,393 B2 | 5/2013 | Zhang |
| 8,707,375 B2 | 4/2014 | Hainline |
| 8,843,972 B2 | 9/2014 | Calisa et al. |
| 9,078,020 B2 | 7/2015 | Buehl et al. |
| 9,204,103 B1 | 12/2015 | Zhang et al. |
| 9,712,850 B2 | 7/2017 | Buehl et al. |
| 9,986,049 B2 | 5/2018 | Zhao et al. |
| 10,194,210 B2 | 1/2019 | Coudurier et al. |
| 11,082,741 B2 | 8/2021 | Xie et al. |
| 11,496,786 B2 | 11/2022 | She et al. |
| 11,889,140 B2 | 1/2024 | She et al. |
| 2002/0059573 A1 | 5/2002 | Nishio et al. |
| 2004/0226045 A1 | 11/2004 | Nadarajah |
| 2005/0033858 A1 | 2/2005 | Swildens et al. |
| 2006/0168632 A1 | 7/2006 | Honda et al. |
| 2008/0215718 A1 | 9/2008 | Stolorz et al. |
| 2008/0306999 A1 | 12/2008 | Finger et al. |
| 2009/0125393 A1 | 5/2009 | Hwang et al. |
| 2009/0168752 A1 | 7/2009 | Segel |
| 2009/0259611 A1 | 10/2009 | Wang et al. |
| 2010/0036954 A1 | 2/2010 | Sakata et al. |
| 2010/0070603 A1 | 3/2010 | Moss et al. |
| 2010/0202509 A1 | 8/2010 | Thompson et al. |
| 2010/0228819 A1 | 9/2010 | Wei |
| 2011/0019627 A1 | 1/2011 | Krishnaswamy et al. |
| 2011/0078327 A1 | 3/2011 | Li et al. |
| 2011/0196894 A1 | 8/2011 | Farber et al. |
| 2012/0079524 A1 | 3/2012 | Kalidindi et al. |
| 2012/0089843 A1 | 4/2012 | Kato et al. |
| 2012/0297410 A1 | 11/2012 | Lohmar et al. |
| 2013/0013377 A1 | 1/2013 | Kruglick |
| 2013/0013688 A1 | 1/2013 | Wang et al. |
| 2013/0268577 A1 | 10/2013 | Oyman |
| 2014/0089998 A1 | 3/2014 | Buehl et al. |
| 2014/0108671 A1 | 4/2014 | Watson et al. |
| 2014/0149794 A1 | 5/2014 | Shetty et al. |
| 2014/0164584 A1 | 6/2014 | Joe et al. |
| 2014/0181285 A1 | 6/2014 | Stevens et al. |
| 2014/0365613 A1 | 12/2014 | Phillips et al. |
| 2015/0012593 A1 | 1/2015 | Phillips et al. |
| 2015/0264413 A1 | 9/2015 | Buehl et al. |
| 2015/0382057 A1 | 12/2015 | Huang et al. |
| 2016/0234069 A1 | 8/2016 | Coudurier et al. |
| 2016/0337426 A1 | 11/2016 | Shribman et al. |
| 2017/0188059 A1 | 6/2017 | Major |
| 2017/0188072 A1 | 6/2017 | Major |
| 2017/0257287 A1 | 9/2017 | Kim et al. |
| 2018/0084306 A1 | 3/2018 | Hunter |
| 2018/0167486 A1 | 6/2018 | Pacella et al. |
| 2018/0219932 A1 | 8/2018 | Natarajan et al. |
| 2018/0241796 A1 | 8/2018 | Srinivasan et al. |
| 2018/0373580 A1 | 12/2018 | Ertl et al. |
| 2018/0376197 A1 | 12/2018 | Gonzalez |
| 2021/0152882 A1 | 5/2021 | Xie et al. |
| 2022/0182685 A1 | 6/2022 | Dai et al. |
| 2022/0217432 A1* | 7/2022 | She ............... H04N 21/2665 |
| 2022/0303331 A1 | 9/2022 | Svennebring et al. |
| 2023/0041976 A1 | 2/2023 | She et al. |
| 2023/0308733 A1 | 9/2023 | Gangakhedkar et al. |
| 2023/0418675 A1 | 12/2023 | Howe et al. |
| 2024/0031420 A1 | 1/2024 | Dai et al. |

FOREIGN PATENT DOCUMENTS

| | | |
|---|---|---|
| CN | 103825837 B | 6/2017 |
| CN | 107251569 A | 10/2017 |
| CN | 107251569 B | 3/2020 |
| EP | 3257233 A1 | 12/2017 |
| EP | 3257233 A4 | 8/2018 |
| EP | 3742706 A1 | 11/2020 |
| EP | 4027616 A1 | 7/2022 |
| JP | 2012080394 A | 4/2012 |
| JP | 2020127130 A | 8/2020 |
| KR | 20100054661 A | 5/2010 |
| KR | 20220059425 A | 5/2022 |
| WO | 2014062581 A2 | 4/2014 |
| WO | 2022034619 A1 | 2/2022 |
| WO | 2022107669 A1 | 5/2022 |

OTHER PUBLICATIONS

U.S. Appl. No. 17/142,982, filed Jan. 6, 2021, Qiang She.
U.S. Appl. No. 17/809,246, filed Jun. 27, 20222, Thomas Howe.
U.S. Appl. No. 17/822,053, filed Aug. 24, 2022, Tongyu Dai.
U.S. Appl. No. 17/937,965, filed Oct. 4, 2022, Qiang She.
Chinese Application Serial No. 201680009559.8, Office Action dated Jun. 26, 2019, 21 pgs.
Dai et al., "Content Delivery Network (CDN) Selection Using Performance Metric," filed Aug. 24, 2022, U.S. Appl. No. 17/822,053, 45 pages.
European Application No. 22150150.5, Search Report mailed May 27, 2022, 9 pgs.
European Application Serial No. 16749817.9, Office Action dated May 6, 2019, 9 pgs.
Extended European Search Report & Opinion for EP Application 16749817.9, dated Jul. 20, 2018, 9 pages.
Howe et al., "Intelligent Content Delivery Network (CDN) Entity Routing," filed Jun. 27, 2022, U.S. Appl. No. 17/809,246, 42 pages.
International Search Report & Written Opinion for PCT Application PCT/US2016/017380 mailed Jun. 8, 2016, 16 pages.
International Search Report dated Nov. 26, 2021, serial No. PCT/IN21/50781, 1 page.
PID Controller, Wikipedia, Retrieved from the Internet on Jun. 27, 2022: https://en.wikipedia.org/wiki/PID_controller.
Gangakhedkar et al., "System and Method for Delivering Media Content to Users," filed Feb. 13, 2023, U.S. Appl. No. 18/041,535, 54 pages.
European Extended Search Report, Application No. 23204937.9, Dated Jan. 25, 2024, 11 pages.
European Search Report, Application No. 23184904.3, dated Oct. 25, 2023, 10 pages.
Office Action for Japanese Application No. 2023-067009, dated Jun. 4, 2024, 3 pgs.

* cited by examiner

SELECTION OF CONTENT DELIVERY NETWORKS USING AGENTS

CROSS REFERENCE TO RELATED APPLICATIONS

Pursuant to 35 U.S.C. § 119(a), this application is entitled to and claims the benefit of the filing date of Chinese Patent Application No. 202211632854.2 filed Dec. 19, 2022, entitled "Selection of Content Delivery Networks Using Agents", the content of which is incorporated herein by reference in its entirety for all purposes.

BACKGROUND

A video delivery system may use multiple content delivery networks (CDNs) to deliver videos to clients. When a client requests a video, the video delivery system may select one of the content delivery networks to process the request during a playback session. Upon selecting the content delivery network, the client communicates with that content delivery network to stream the video.

Different content delivery networks may provide different quality of service (QOS) to different clients. Accordingly, the content delivery network that is assigned to a client may impact the playback experience during the playback session. For example, a first content delivery network may provide a first quality of service and a second content delivery network may provide a second quality of service to the client to play back the video. When the first quality of service and the second quality of service playback experiences are different, it may be desirable for the video delivery system to assign the content delivery network that may most likely result in a higher quality of service to the playback session for the video. However, using random selection, the video delivery system may not optimally assign content delivery networks to requests for videos.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
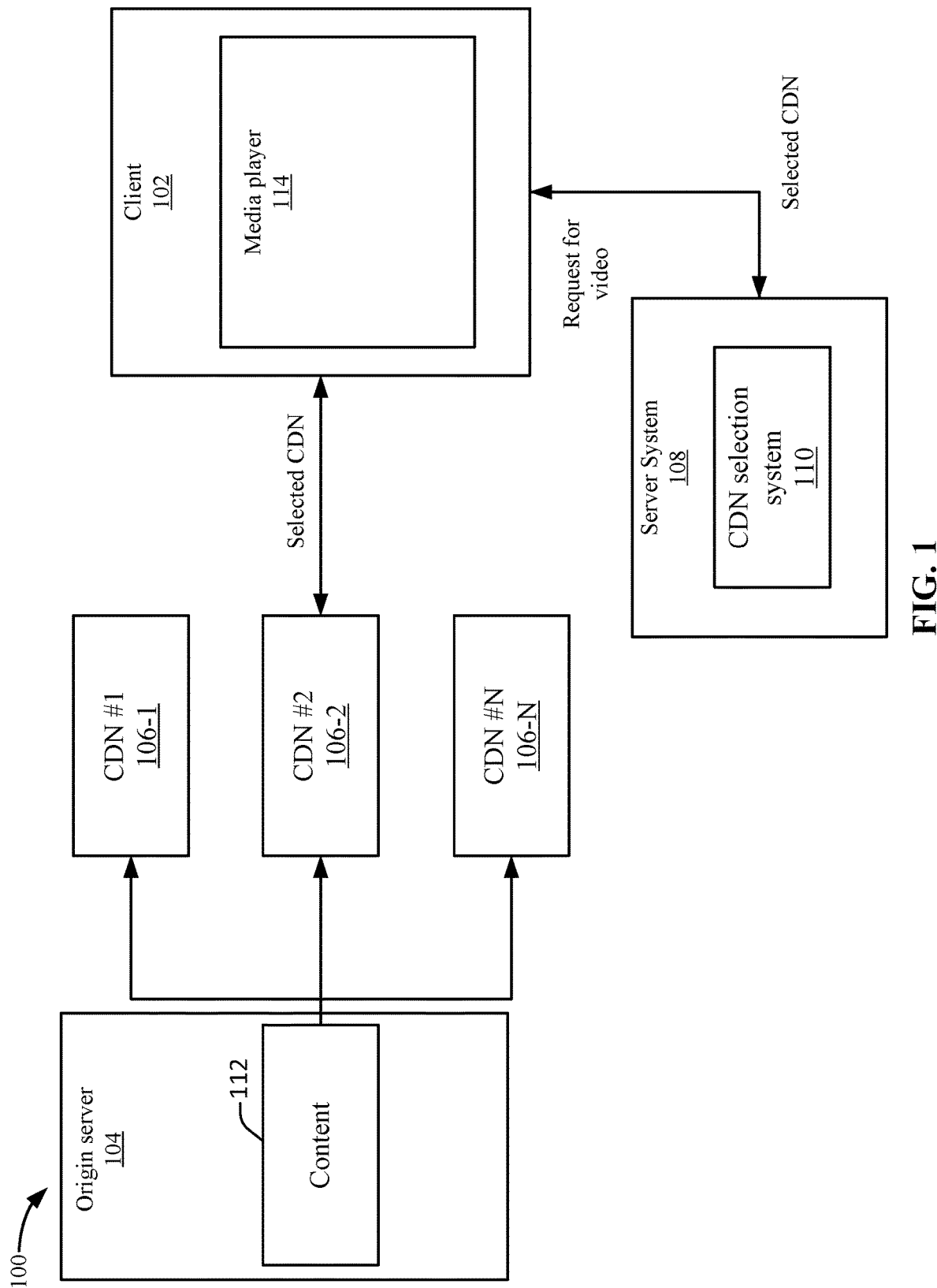
FIG. 1 depicts a simplified system for selecting a content delivery network according to some embodiments.

Described herein are techniques for a video delivery system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

As discussed above, a video delivery system may use multiple content delivery networks (CDNs) to deliver content to clients. When a client requests an instance of media content, the video delivery system may select one of the content delivery networks to process the request during a playback session. A content delivery network (CDN) selection system may include a prediction engine and an allocation engine. The prediction engine may predict a performance metric. The performance metric may be based on the delivery of media content to a client, but may also be metrics for other applications, such as performance of a profile in an adaptive bitrate algorithm. The metric may be a quality of service (QOS) performance, but other metrics may be used. In some embodiments, the CDN selection system may predict a QoS performance score for multiple content delivery networks that can deliver media content to the client. After predicting the QoS performance scores, the allocation engine may select a content delivery network from the available content delivery networks based on the predicted QoS performance score for the respective content delivery networks, such as by selecting the content delivery network with the top ranked (e.g., highest) QoS performance score.

Conventionally, the prediction of QoS performance may be modeled as a machine learning problem. For example, features that will be input to a machine learning model may be selected, historical data for the features is collected, and a model is trained with a large amount of historical data to predict the QoS performance. One disadvantage when using the machine learning model is that machine learning model predicts the expectation of QoS performance to exploit the historical observations. The expectation may be the attempt to maximize performance based on historical data. This means that a content delivery network that experiences a poor QoS performance may have a poor QoS performance score predicted by the machine learning model. If there are very few QoS historical observations for a respective content delivery network, the average Qos performance may be at high risk of being poor and also the content delivery network may not be selected very often by the allocation engine (e.g., if the allocation engine is skewed to select content delivery networks with higher scores). However, the content delivery network may actually be able to provide good QoS performance over time if selected. But, the content delivery network may not be selected due to the poor QoS performance scores that are generated based on a small number of poor QoS performance historical observations.

Some embodiments provide advantages over conventional methods by using an agent that performs the QoS performance prediction. The agent may include parameters to measure exploitation and exploration. The exploitation may be an expected performance (e.g., a mean), and the exploration may be potential, which may be based on the variance of a random variable. A QoS performance score that uses exploitation and exploration may be an upper confidence bound (UCB). The upper confidence bound may be an upper boundary that is based on the expected performance and the exploration of potential, which will be described in more detail below. Accordingly, the agent may generate a prediction that is based on the exploitation of historical data and also the potential for a content delivery network to deliver a predicted performance. This provides a more accurate prediction for QoS performance because the QoS prediction may compensate for a small number of historical observations, which may allow a content delivery network to still be selected to explore its potential performance even when a small number of observations may be received.

Also, the machine learning model method may have the disadvantage of generalizability. That is, the QoS performance may change over time due to various factors, which leads to the degradation of the output of the machine learning model as conditions change and the models do not adapt. To update the output of the machine learning model, the machine learning model needs to be retrained using a considerable amount of data. Updating the machine learning model may be time consuming because parameters of the machine learning model need to be retrained using the data, and this retraining cannot be performed in real time, such as after sessions for requests are finished (e.g., the video delivery ends). Rather, the machine learning model may have to be taken offline, retrained, and then reinstalled with new parameter values. Accordingly, the machine learning model may not accurately predict QoS performance as data varies over time.

In some embodiments, the agent can be updated in real time using a result of the allocation for the current request. For example, a request for media content from a client may be received and the QoS performance score is predicted for multiple content delivery networks. The allocation engine may then select a content delivery network to service the request. The delivery of the content for the request may then be observed. For example, the performance of the playback of the content may be observed, and QoS performance is measured, such as the delivery of content is observed for any rebuffer instances that occur. Then, feedback from the delivery of content may be used to adjust the agent in real time. For example, the CDN selection system uses the feedback to adjust one or more parameter values of the agent that is used to perform the prediction of QoS performance scores. In some examples, the CDN selection system may adjust the parameters of a respective agent for the selected content delivery network based on whether a rebuffer occurred or not. In some embodiments, CDN selection system may perform the update in real time because the update may be lightweight, such as requiring one or more operations, such as one or more addition operations, to update the parameters of the agent in contrast to having to perform a retraining of a machine learning model.

System Overview

FIG. 1 depicts a simplified system 100 for selecting a content delivery network 106 according to some embodiments. System 100 includes content delivery networks (CDNs) 106-1 to 106-N, a client 102, an origin server 104, and a server system 108. A content provider may operate server system 108 to provide a video delivery service that allows entities to request and receive media content from a library of media content, such as on-demand videos and live videos. The content provider may use server system 108 to coordinate the distribution of media content to clients 102. The media content may include different types of content, such as video, audio, or other types of content information that can be rendered on computing devices. Video may be used for discussion purposes, but other types of content may be appreciated. An instance of media content may be an instance that is requested for a request. For example, a first instance of media content may be for a first show, and a second instance of media content may be for a second show, a third instance may be for the first show, etc.

Content delivery networks 106 may deliver instances of media content for the video delivery service. Content delivery networks 106 may include one or more computing devices, such as servers, that deliver instances of media content to client 102. A content provider may operate its own content delivery network, in addition to contracting with multiple third-party content delivery networks to assist in the delivery of its media content to clients 102. Although an instance of client 102 is shown, content delivery networks 106 may be delivering media content to one or more instances of clients 102. Also, content delivery network 106 may include multiple computing devices, such as edge nodes, which may be geographically distributed. The edge nodes may receive segments of the media content from origin server 104 and deliver the segments to different clients 102. Any server associated with content delivery network 106 may perform the functions described herein. Also, although server system 108 and content delivery networks 106 may be described, functions performed by either may be distributed between the two entities, or performed by other entities.

Client 102 may include a computing device, such as a smartphone, set top box, tablet device, living room device, gaming console, etc. Client 102 includes a media player 114 that can play the content. Client 102 may use one of the content delivery networks 106, such as a content delivery network #2, to begin playing an instance of media content with media player 114.

Server system 108 may process a request for an instance of media content from client 102. Although not shown, server system 108 may be processing requests from multiple clients 102, both sequentially and concurrently. For example, clients 102 may be using a video delivery service to request videos concurrently or within a time period.

Origin server 104 may store representations of media content in storage 112. The representations may include different playback characteristics for the content, such as different representations of media content that were encoded at different bitrates or quality (e.g., resolutions). For example, a video may be encoded at different bitrates. In some examples, client 102 may be able to request an instance of media content from each content delivery network 106 and each content delivery network 106 may independently be able to respond with a representation of the instance of media content. For example, each content delivery network 106 may include one or more servers that can request and receive the representations of media content from origin server 104. Then, each content delivery network 106 can deliver an instance of media content to client 102.

Server system 108 is configured to select one of content delivery networks 106 to process the requests for instances of media content. A content delivery network (CDN) selection system 110 may select the content delivery network for the request and provide selection data representing the selection of a content delivery network 106 to client 102. The selection data may be provided to the selected content delivery network 106, either in addition to or instead of providing it to client 102. Client 102 may then interact with the selected content delivery network 106, such as content delivery network #2 106-2, to request segments of the instance of media content. Content delivery network #2 106-2 may then deliver the segments to client 102, which displays the segments on media player 114.

Clients 102 may experience different playback conditions during playback of instances of media content. For example, the playback conditions may differ for each content delivery network 106. This may result in instances of media content being delivered to clients 102 at different values of a performance metric. A performance metric may be referred to as quality of service, which may be the measurement of performance of the service of delivering instances of media content from content delivery networks 106 to clients 102. Some metrics that may be used to measure the quality of service performance metric may be related to the network performance, such as connection induced rebuffer, packet loss, bitrate, throughput, transmission delay, network availability, jitter, etc. The performance metric may be based on one or more metrics.

A CDN selection system 110 may select a content delivery network 106 for a request based on a selection process. For example, CDN selection system 110 may use an analysis of a performance metric for content delivery networks 106 to select a content delivery network 106 for a request. For example, CDN selection system 110 may predict QoS performance scores for content delivery networks 106. In some embodiments, the QoS performance scores may measure a likelihood of a rebuffer occurring. For example, a connection induced rebuffer may be used. The connection induced rebuffer may reflect the network condition between client device 102 and the respective content delivery network 106. That is, a connection induced rebuffer that is experienced due to the connection may suggest that there is a problem with the network connection, such as the connection induced rebuffer may occur due to the network delivery of content. This may be different from a rebuffer that may occur due to lack of computer processing resources on client 102. The connection induced rebuffer may be measured based on an amount of data that is received and stored in the buffer. If sufficient data is not received to support the playback of the content, client 102 may determine that a connection induced rebuffer occurred. Another rebuffer may occur when there is sufficient data in the buffer to support playback, and client 102 may not consider this a connection induced rebuffer. In other embodiments, rebuffer occurrences may just be measured because most rebuffers may be caused by network problems. In general, a higher predicted QoS performance score may indicate a lower possibility of experiencing a rebuffer.

In some embodiments, CDN selection system 110 may perform the selection in real time upon receiving a request for an instance of media content. That is, CDN selection system 110 receives a request for an instance of media content (e.g., a program), and selects one of content delivery networks #1 to #N. Then, CDN selection system 110 may send the identification of the selected content delivery network to client 102, which may then request the instance of media content from that selected content delivery network 106. Other methods for communicating the selection of content delivery network 106 for a request may also be appreciated. For example, CDN selection system 110 may send the request to the selected content delivery network 106, which may then communicate with client 102. The selection process will be described in more detail below starting in FIG. 2.

Upon the delivery of the instance of media content from the selected content delivery network 106 to client 102, a performance metric may be measured. The measurement of a performance metric may be performed using different methods, such as clients 102 may send information that is used to measure a performance metric, content delivery networks 106 may send the information, etc. For example, if connection induced rebuffer is being used, determining whether one or more rebuffers occur may be measured or a ratio is used of number of rebuffers based on an amount of data delivered. As mentioned above, rebuffers may be caused by different factors. Connection induced rebuffers may be measured. In other embodiments, rebuffer occurrences may just be measured because most rebuffers may be caused by network problems. Although measuring rebuffer occurrences is described, other factors may also be measured, such as video startup time or throughput. The feedback from the performance metric may be used for selecting a content delivery network 106 for subsequent requests for media content from this client 102 or other clients 102 after the feedback is received. For example, CDN selection system 110 may update the parameter values of an agent using the measured performance metric, which will be described in more detail below starting at FIG. 4.

The following will now describe CDN selection system 110 in more detail followed by the QoS prediction process and the allocation process.

CDN Selection System

Figure 2:
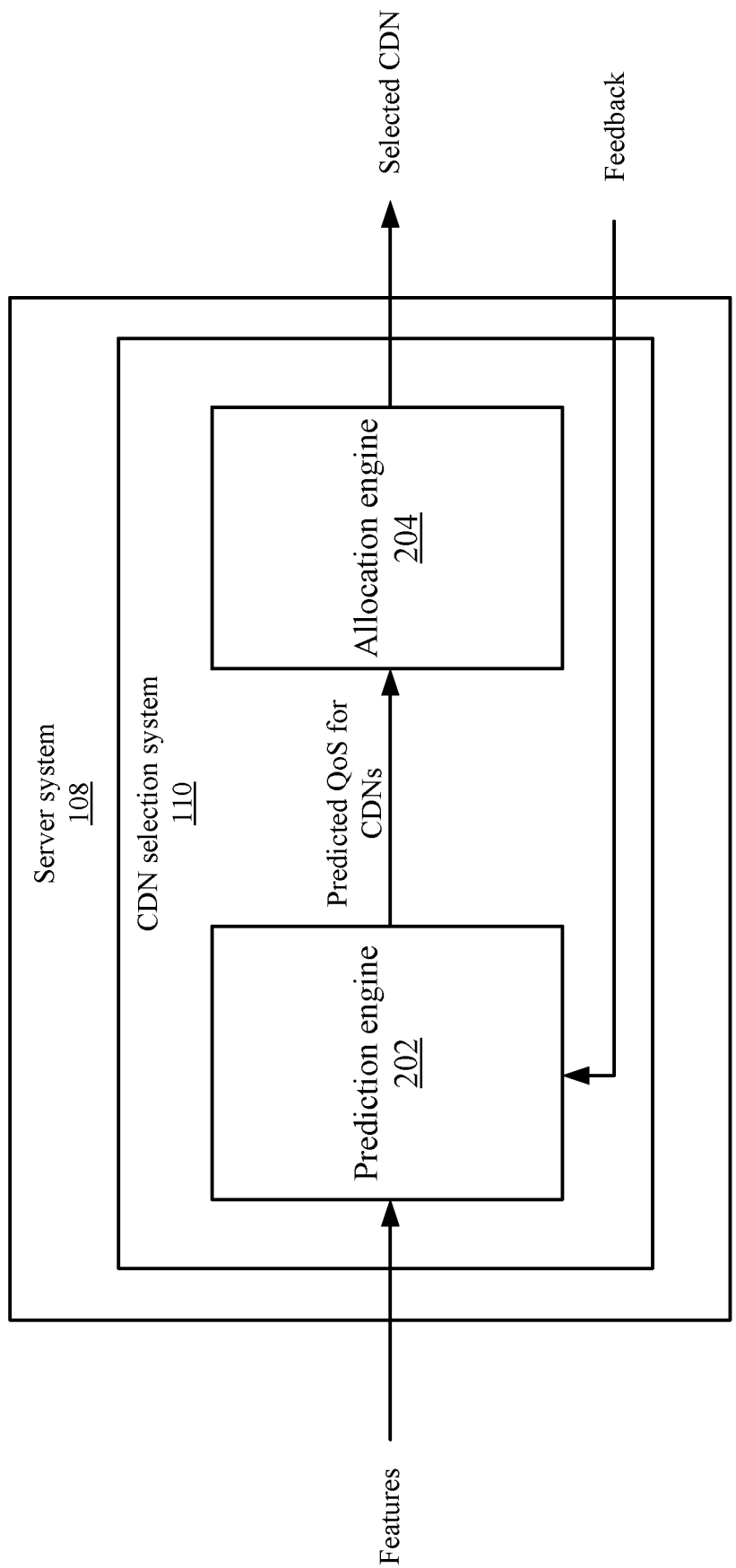
FIG. 2 depicts a more detailed example of a CDN selection system according to some embodiments.

FIG. 2 depicts a more detailed example of CDN selection system 110 according to some embodiments. CDN selection system 110 receives a request for an instance of media content from client 102. Although not shown, CDN selection system 110 may be receiving multiple requests for instances of media content from multiple clients 102. The request may be for different media content, or the same media content. For example, a first request is for a first program, a second request is for a second program, and a third request is for the first program.

Prediction engine 202 receives input for the request and outputs QoS performance scores for the content delivery networks. In some embodiments, features may be selected as input for prediction engine 202. The input for the request includes values for the features that are associated with characteristics of the request. In some embodiments, the following features in Table I may be used, but others may be appreciated:

TABLE I

| Feature | Description |
| --- | --- |
| Device platform | The player device platform for the current session. |
| Region | The region where the client is located. |
| City | The city where the client is located. |
| ISP | The Internet Service Provider (ISP) of the client's IP address. |
| DMA | Designated market areas which delineate the geographic boundaries of N distinctive regions in USA. |
| Network type | The kind of current network of the client, e.g., 'wifi', '4g', etc. |
| GeoIP region | IP address location. |
| Hour of day | Hour of a day. |

In Table I, the features may include device platform, region, city, Internet Service Provider, designated market area, network type, geographic region, hour of the day, etc. The features may be categorical features and the number of categorical values may vary. For example, for the feature City, there may be 20,000 cities in the United States and 5000 cities in Canada. The values associated with the features may be determined based on the request that is received. For example, when a request is received from client device 102, and client device 102 is in Santa Monica, a value for the GeoIP may be associated with Santa Monica or the zip code for Santa Monice. Similarly, if the time is 2:00 PM, that time is input for the feature of Hour of Day.

Prediction engine 202 may generate a prediction for content delivery networks. For example, there may be three content delivery networks that may be able to service the request. Prediction engine 202 may then generate a QoS performance score for each content delivery network. For example, the predicted scores for the QoS performance may be [0.43, 0.55, and 0.54]. The scores may be ranked, such as a higher score is ranked higher. In some embodiments, the higher predicted QoS performance score may indicate that the respective content delivery network may deliver a higher QoS performance for the request. For example, a higher value may indicate a lower likelihood of experiencing a rebuffer during playback of the video. In other embodiments, the value of the score may indicate other likelihoods, such as a lower score may indicate a lower likelihood of experiencing a rebuffer. In this case, a lower score is ranked higher.

After outputting the QoS performance values, allocation engine 204 may select a content delivery network to service the request. Allocation engine 204 may use different methods to select the content delivery network. In some embodiments, allocation engine 204 may select the content delivery network with the highest predicted QoS performance score. For example, allocation engine selects content delivery network #2 because its QoS performance score of 0.55 is the highest out of the three values [0.43, 0.55, and 0.54]. However other methods may be used, such as weighted random selection, a function, etc. The weighted random selection may weight content delivery networks using the scores, but randomly select the content delivery network using the weights. However, selecting the highest ranked content delivery network may improve performance because the content delivery network with the lowest likelihood of experiencing lower performance, such as a rebuffer, is selected. With weighted random selection, a content delivery network may be selected based on a random variable, but higher weighted content delivery networks may have more of a chance to be selected. After selecting the content delivery network, allocation engine 204 outputs the selected content delivery network.

CDN selection system 110 may receive feedback from the delivery of the media content to client device 102. As discussed above, different feedback metrics may be used and will be discussed below in FIG. 4.

The prediction process will now be described in more detail.

Prediction Process

Prediction engine 202 uses an agent to generate a value for the QoS performance. The agent may receive values for the features associated with the request and output the QoS performance scores for content delivery networks. In some embodiments, each content delivery network may be associated with an agent. That is, each agent for a content delivery network may include different parameter values based on the performance of the respective content delivery network. However, the agents for respective content delivery networks may be implemented in different ways. For example, a single agent may include different portions that generate QoS performance scores for respective content delivery networks.

Figure 3:
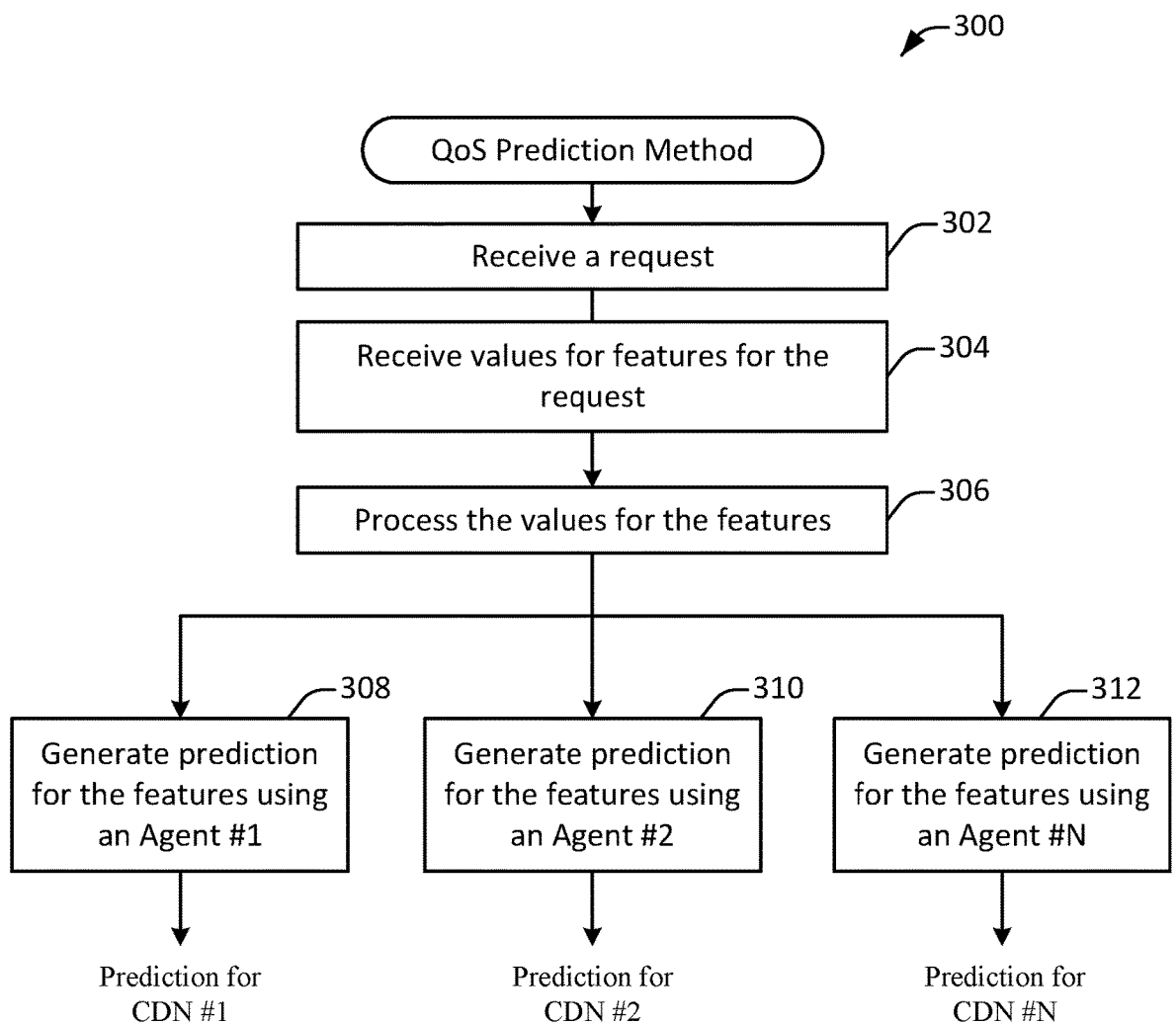
FIG. 3 depicts a simplified flow chart for a method for performing QoS prediction according to some embodiments.

FIG. 3 depicts a simplified flow chart 300 for a method for performing QoS prediction according to some embodiments. At 302, CDN selection system 110 receives a request. The request may be for a video to be played back in a playback session. At 304, CDN selection system 110 receives values for features for the request. As discussed above, the values for the features may be based on information associated with the request, such as information based on the client that sent the request, the network type that is being used by the client, and the context of a playback session.

At 306, CDN selection system 110 processes the values for the features. The processing of the values may include using an agent to generate a QoS performance scores based on the values. For example, at 308, an agent #1 generates a prediction for a content delivery network #1 using the features. Similarly, at 310, agent #2 generates a prediction for a content delivery network #2 using the features, and at 312, agent #N generates a prediction for a content delivery network #N using the features. That is, a prediction is generated for each of an N number of content delivery networks using the same feature values. As discussed above, each respective agent for a content delivery network may have different values for parameters. Thus, each respective agent may generate a prediction for a respective content delivery network based on the respective parameter values and the same feature values. This may result in predictions that may have different values, or similar values if the agents include the same parameter values. One example of values that are generated by agents may include [0.43, 0.55, and 0.54] for content delivery networks, #1, #2, and #N, respectively.

After performing the prediction, the process then proceeds to perform the allocation process.

Allocation

Figure 4:
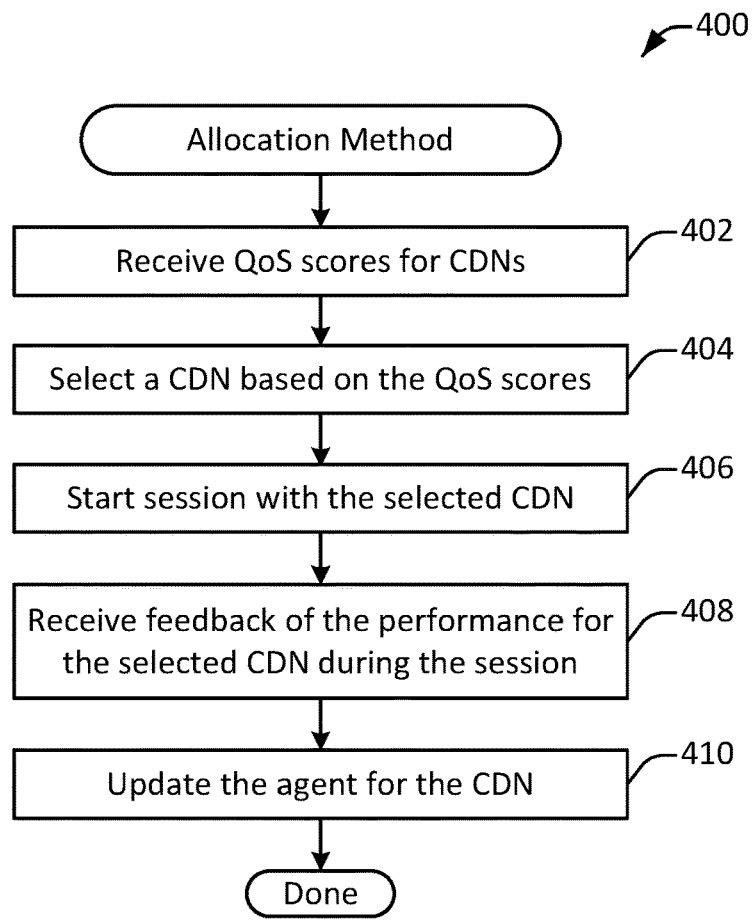
FIG. 4 depicts a simplified flow chart of a method for selecting a content delivery network using an allocation method according to some embodiments.

FIG. 4 depicts a simplified flow chart 400 of a method for selecting a content delivery network using an allocation method according to some embodiments. At 402, CDN selection system 110 receives QoS performance scores for content delivery networks. For example, CDN selection system 110 receives a QoS performance score for each respective content delivery network. Then, 404, CDN selection system 110 selects a content delivery network based on the predictions. For example, using a selection process, CDN selection system 110 may select one of the content delivery networks based on its respective QoS performance score. As discussed above, if the three scores are [0.43, 0.55, and 0.54]. CDN selection system 110 may select content delivery network #2 with a highest QoS performance score of 0.55.

At 406, CDN selection system 110 may start the session with the selected content delivery network. For example, if content delivery network #2 is selected, information is sent to client device 102 with the selected content delivery network. Then, client device 102 may then start a playback session to play back the requested content using content delivery network #2.

At 408, CDN selection system 110 receives feedback for a performance metric of the selected content delivery network during the session. For example, CDN selection system 110 may receive information regarding the delivery of the content using content delivery network #2. The feedback may be the same metric that is being predicted as the QoS performance, such as whether a rebuffer occurred. However, other information may also be received, such as the number of rebuffers that occurred, a playback start time, etc. CDN selection system 110 may then use the feedback to update the agent for the content delivery network of 410. For example, a CDN selection system 110 updates one or more parameter values for the agent #2 of content delivery network #2. In some embodiments, if a rebuffer is not experienced, the parameters may be updated to predict a higher QoS performance in the next session, or if a rebuffer is experienced, the parameters may be updated to predict a lower QoS performance.

The following will now describe more details of an agent. It is noted that the agent may use different methods to generate the prediction. Although the following method is used, other methods may be appreciated.

Agent

Figure 5:
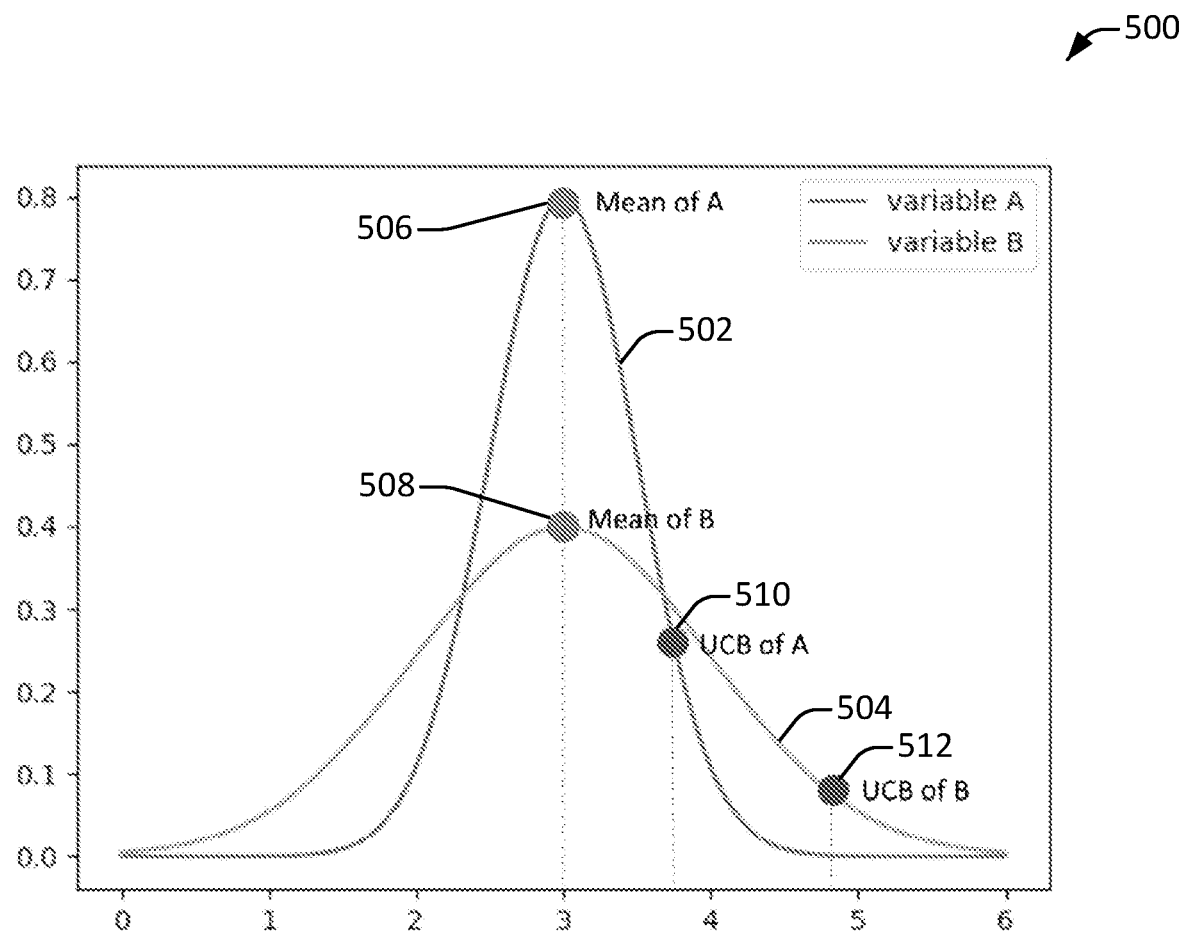
FIG. 5 depicts a graph that describes an upper confidence bound according to some embodiments.

In some embodiments, an agent may generate a QoS prediction score using an upper confidence bound. The upper confidence bound may define a point that a certain percentage of a distribution is less than. For a random variable, if it is a 95% possibility that the value is less than 10, then the upper confidence bound at the 95% confidence level is 10. FIG. 5 depicts a graph that describes the upper confidence bound according to some embodiments. Graph 500 depicts a difference between a mean value and the upper confidence bound. A curve 502 depicts the distribution of a random variable A, and a curve 504 depicts the distribution of a random variable B. The two curves share the same mean value, but have different variances. The mean is the average of the values. For variance, the distribution of values may vary differently. As can be generally seen, curve 502 includes more areas that are in between the values of two and four and curve 504 includes values that are more spread out between values 1 and 5.

At 506 and 508, the mean of curve 502 and curve 504, respectively, is the same value of "3". At 510, the upper confidence bound of curve 502 is shown and 512, the upper confidence bound of curve 504 is shown. Variable B includes a larger upper confidence bound because it has a larger variance in curve 504. That is, the values that are distributed under curve 504 vary more than the values under curve 502.

Traditional machine learning models may predict the mean value of the random variable in which case the machine learning models may predict the same value for both curves. If the mean value represents a poor QoS performance for a content delivery network, and there are very few QoS historical observations for the content delivery network, the content delivery network may not be selected very often by the allocation engine. However, the content delivery network may be able to provide good performance if selected. In contrast, the upper confidence bound may reflect both the mean value and variance. The mean value may be associated with the exploitation of the variable and the variance may be associated with the exploration of the variable. Leveraging both mean value and variance may form the prediction of the expectation and potential of the variable. In FIG. 5, Variable B with its curve of 504 has a higher upper confidence bound 512 which may reflect that its curve 504 has a higher potential of delivering a higher performance than Variable A with its curve 502 and upper confidence bound 510.

Figure 6:
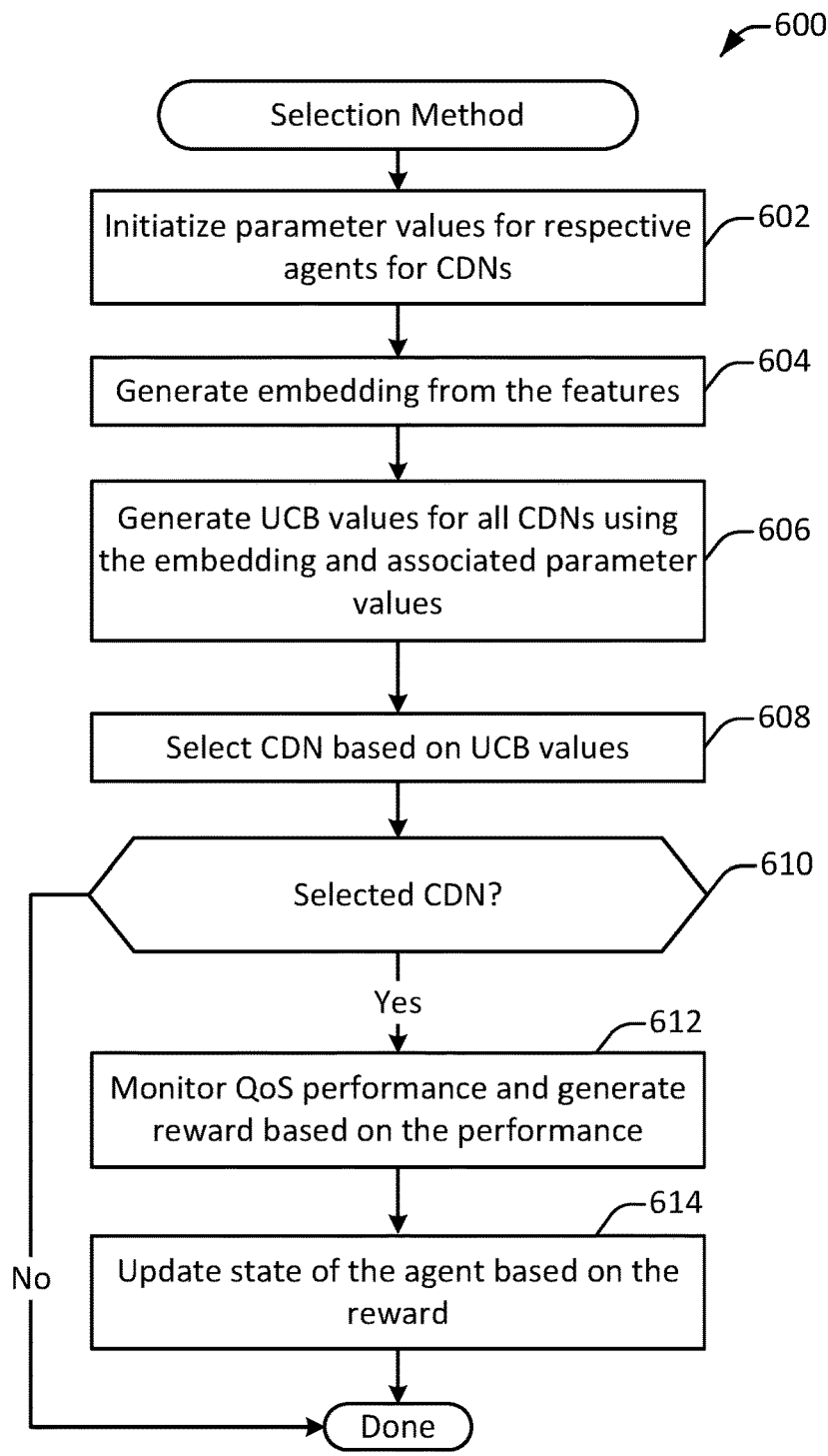
FIG. 6 depicts a simplified flow chart of a method for performing selection of a content delivery network using the upper confidence bound according to some embodiments.

FIG. 6 depicts a simplified flow chart 600 of a method for performing selection of a content delivery network using the upper confidence bound according to some embodiments. At 602, CDN selection system 110 initializes the parameter values for respective agents for content delivery networks 106. In some embodiments, an agent may include parameters, which may be a matrix $A \in R^{d \times d}$ and a vector $b \in R^d$, where R is the set of real numbers and d denotes the dimension of the embedding in the embedding space. The parameters are responsible to store information on historical observations, where matrix A records features and vector b records features and observations in different ways. On the assumption that upper confidence bound is linear in its features, the agent may predict the upper confidence bound using different methods, such as ridge regression. Then, the agent may calculate the upper confidence bound using:

$$UCB_c \leftarrow e_s^T A_c b_c + \alpha \sqrt{e_s^T A_c^{-1} A_c b_c},$$

where the first component represents the exploitation by predicting the expectation (e.g., mean value), the second component represents the exploration (e.g., variance), and α is a hyperparameter that controls the tradeoff between exploiting and exploring. Also, "$e_s$" represents the embedding of the features for a session, "s" is the session, "T" denotes the transpose of matrix and "−1" denotes the inverse of matrix. "c" indicates the content delivery network, e.g., each of the upper confidence bound values is calculated separately for the content delivery networks. In general, when the number of observations is low, the value of the second component may be higher. However, when the number of observations increases, the value of the second component may decrease. The values for the parameters may be stored in storage as a state for the agent, and the agent uses the values to generate upper confidence bound scores.

At 604, CDN selection system 110 generates an embedding from the features. For example, the embedding may be a representation of the values for the features within an embedding space. At 606, CDN selection system 110 generates a value for the upper confidence bound for all content delivery networks using the embedding and the associated parameter values for each respective agent. For example, CDN selection system 110 retrieves values for the parameters from storage and applies the embedding to the values. CDN selection system 110 may perform operations, such as multiplication and addition to determine the upper confidence bound. At 608, CDN selection system 110 selects the content delivery network based on the upper confidence bound values.

After selecting the content delivery network, at 610, CDN selection system 110 determines which content delivery network to monitor for feedback. For the selected content delivery network, at 612, CDN selection system 110 monitors the delivery of the content and generates a reward based on the performance. In some embodiments, CDN selection system 110 may determine a reward value based on the feedback received from the delivery of the content. In some embodiments, if a rebuffer occurs during the session, the reward may be set as a first value, such as "0", or if rebuffer is not experienced, the reward is set as second value, such as "1". The value of "1" may be a higher reward that is more valuable indicating that this session was a success compared to the value of "0". At 614, CDN selection system 110 updates the agent based on the reward. For example, the update may involve an operation, such as an addition. For example, CDN selection system 110 performs two matrix additions to update the parameter values of the agent and stores the new values in storage. Compared with retraining parameters for a machine learning model, the updating is faster and lightweight because the additions can be performed in real time without the need to retrain the models. In some embodiments, the agent is updated as follows: $A_t \leftarrow A_t + e_s e_s^T$, $b_t \leftarrow b_t + r_s e_s$. That is, the matrix A is updated using the embedding of the session. The matrix A may be the summation of $e_s e_s^T$ in terms of all historical sessions, recording the information of the features. Also, the vector b is being updated using the reward and the embedding of the specific session. The vector b may be the summation of $e_s$ in terms of positive historical sessions, recording the information of the features of positive sessions. For example, a positive reward may increase the value of the vector $b_i$ for the session because the reward value times the embedding is added to the vector $b_i$. A negative reward may keep the value for the vector $b_i$ the same because the reward value of "0" makes the second term the value of "0".

The following will now describe an example to show the generation of the upper confidence bound score.

Example

Figure 7:
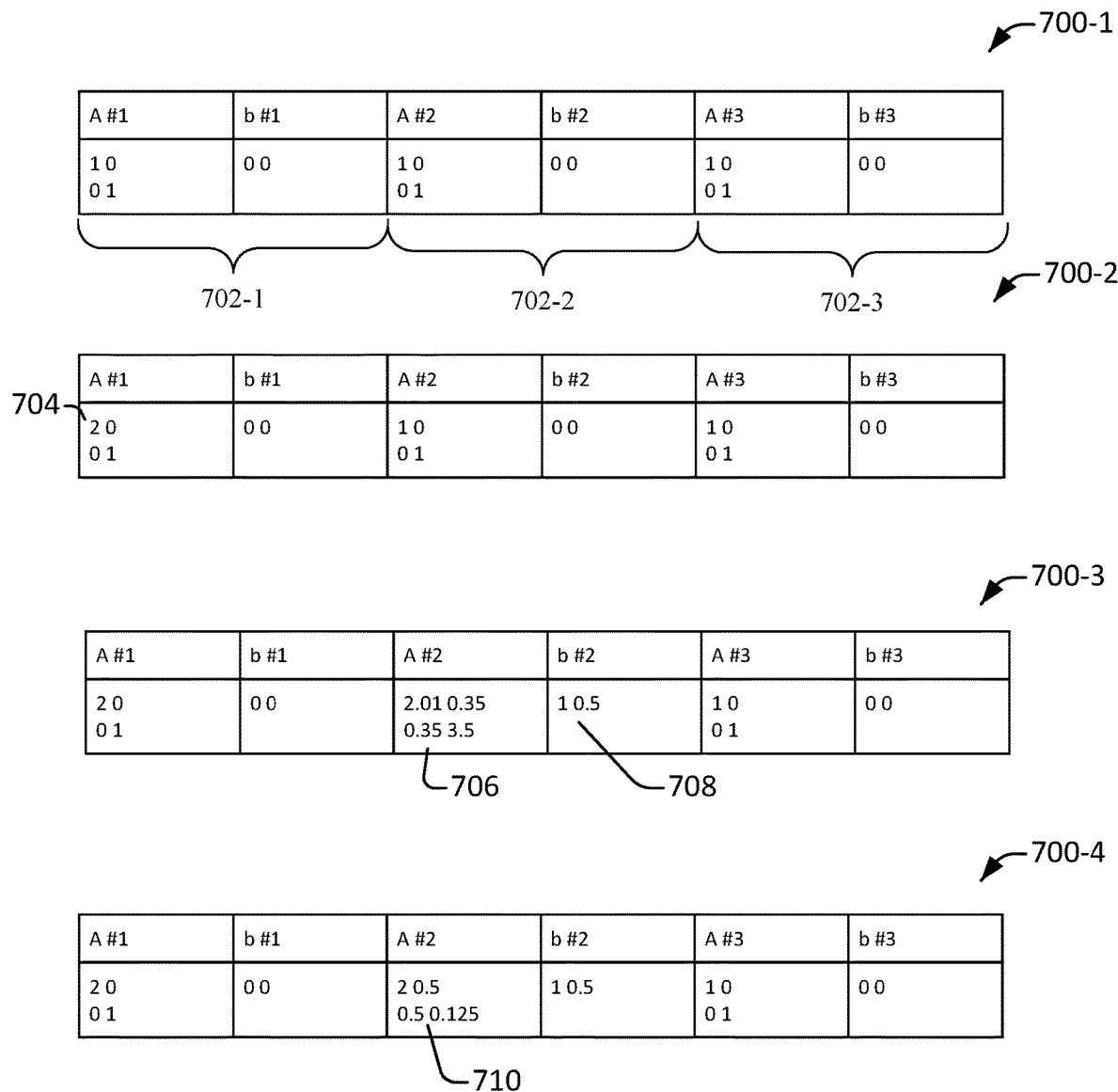
FIG. 7 depicts an example of the states that are calculated using an agent according to some embodiments.

FIG. 7 depicts an example of the states that are calculated using an agent according to some embodiments. CDN selection system 110 is selecting among three content delivery networks, which may be named content delivery network #1, content delivery network #2, and content delivery network #3. Three agents, agent #1, agent #2, and agent #3, may be initialized. The parameters of a respective agent #i may be A #i and B #i. For each session, two features may be used of region and DMA, but other features may also be appreciated. The hyper parameter a equals 0.5, which may balance the two components of exploitation and exploring equally. The value of the hyperparameter may be changed if either component of exploiting or exploring should be favored more. The values of the features are encoded as an embedding for the agents. When the predicted QoS values for the upper confidence bound are output, CDN selection system 110 may select the largest value as the content delivery network to service a request. After delivery of the content to client 102, feedback for the playback session is received and CDN selection system 110 updates the stored values for the respective agent that is associated with the selected content delivery network.

The following will describe the state of the values for the parameters of the agent over multiple sessions. In a table 700-1, the initial state of the parameters is shown. As noted above, the parameter A is a matrix and the parameter b is a vector. These parameters store information that reflects the historical observations when content delivery networks are selected. The parameter values for content delivery network #1 are shown at 702-1, the parameter values for content delivery network #2 are shown at 702-2, and the parameter values for content delivery network #3 are shown at 702-3. The matrix for parameter value A is a 2×2 matrix with the values "1 0" on the first row and the values "0 1" on the second row. The matrix may be a 2×2 identity matrix, which includes the value of "1" on a main diagonal and the value of "zeros" elsewhere as shown. The values for the vector b are 0 0. The vector may be a 2-dimensional vector. Both the initial states of A and b are empty states. The size of A and b corresponds to the size of the embedding, and may be different if more features are used instead of two.

In a session #1, the embedding may be [−1, 0], which represents a value of −1 for region and 0 for DMA. The agents #1, #2, #3 calculate the upper confidence bound as [0.5, 0.5, 0.5], respectively. In this case, CDN selection system 110 may select content delivery network #1 even though the values for the upper confidence bound for each content delivery network are the same. In other examples, content delivery network #2 or #3 may also be selected. In some embodiments, CDN selection system 110 may use a tie breaker when the highest values for the upper confidence bound are the same. Different methods for breaking a tie may be appreciated, such as random selection, selecting a content delivery network that has been selected less than the other content delivery networks, selecting the content delivery network based on cost to deliver the content, etc. After selecting content delivery network #1, the playback session for content delivery network #1 is observed and there is a rebuffer occurrence. In this case, the reward is equal to 0. A table 700-2 shows the updated state of the values after session #1 as defined by $A_t \leftarrow A_t + e_s e_s^T$, $b_i \leftarrow b_i + r_s e_s$. At 704 for agent #1, the value of matrix A in the first row is changed from [1 0] to [2 0] to reflect the selection of content delivery network #1. The value for vector b is not changed because there was a rebuffer. The values for the other agents #2 and #3 do not change because the associated content delivery network for the other agents was not selected. However, in other examples, the values for these agents may be adjusted based on the feedback for agent #1. For example, the values for agents #1 and #2 may be adjusted to reflect a more positive prediction of QoS performance should be generated due to a rebuffer occurring with content delivery network #1.

In a session #2, the embedding is [1, 0.5]. Agents #1, #2, #3 calculate the upper confidence bound as [0.43, 0.55, 0.55]. CDN selection system 110 selects content delivery network #2. Content delivery network #2 and content delivery network #3 have the same predicted upper confidence bound, but content delivery network #2 is selected. During the delivery of the content using content delivery network #2, there is no rebuffer during the session. Accordingly, the reward value is equal to 1. In table 700-3, at 706, the matrix A #2 is updated to the values shown and, at 708, vector b #2 is updated to the values shown. For example, the matrix A #2 has the first row updated to [2.01 0.35] from [1 0] and the second row updated to [0.35 3.5] from [1 0] to reflect content delivery network #2 being selected. Vector b #2 is updated to [1 0.5] from [0 0] to show the effect of a positive reward.

In a session #3, the embedding is [−0.1, 1.5] and the upper confidence bound is [0.750, 1.0, 0.751]. CDN selection system 110 selects content delivery network #2 because it has the highest upper confidence bound score of 1.0. After observation of the playback session for content delivery network #2, there is a rebuffer and the reward is equal to 0. In a table 700-4, at 710, the matrix A #2 is updated to the values shown to reflect the selection of content delivery network #2 and vector b #2 stays the same because the reward was 0. For example, the matrix A #2 has the first row updated to [2 0.5] from [1.01 0.35] and the second row updated to [0.5 0.125] from [0.35 3.5].

In the above example, when the hyper parameter alpha set at 0.5, when session #3 occurs, the upper confidence bound is the sum of two parts:

UCB #1=0+0.5*1.501

UCB #2=0.28+0.5*1.4

UCB #3=0+0.5*1.503

The first component reflects the exploitation and the second component reflects the variance. Agent #2 has twice the number of observations and updates, which leads to the lowest variance of 1.4 (e.g., the second component is the hyper parameter of 0.5*the variance of 1.4). Agent #3 received no observations because it was not selected and this suggests a larger potential capacity for exploring values. This leads to the largest variance of the group at 1.503. Agent #1 has one observation with a rebuffer, and agent #2 has one observation with a rebuffer and one other observation without a rebuffer. From the historical observations of being selected, agent #2 has a larger expectation value of 0.28 compared to an expectation value of 0 for agent #1. If the mean was just used without variance, then the rebuffer that is experienced by content delivery network #1 may reduce the chance of it being selected for subsequent requests because the negative observation may cause poor QoS performance scores to be predicted. However, there still may be potential for content delivery network #1 to provide an acceptable performance (e.g., without rebuffers). The variance of 1.501 may allow the potential performance of content delivery network #1 to still be explored.

Conclusion

Some embodiments select content delivery networks based on predicted QoS performance. This may lead to a better network connection as the content delivery network with the smallest predicted possibility of experiencing adverse network conditions, such as rebuffers, may be assigned to a request. The prediction is also calculated using an improved process by allowing the feedback to be incorporated in real time after a session for a selected content delivery network is completed and feedback is received. The update may be performed faster compared to a machine learning model.

Compared with previous solutions, the present solution may consider the performance difference between different content delivery networks with the use of exploitation and exploring. This may improve the overall quality of service performance and user experience. The trade off of balancing exploring and exploiting may also be adjusted by adjusting the hyper parameter a. Using the parameter of exploring the potential capacity, the potential of a content delivery network may not be ignored when there are very few observations for the respective content delivery network or there may be a small amount of adverse observations for the content delivery network.

System

Figure 8:
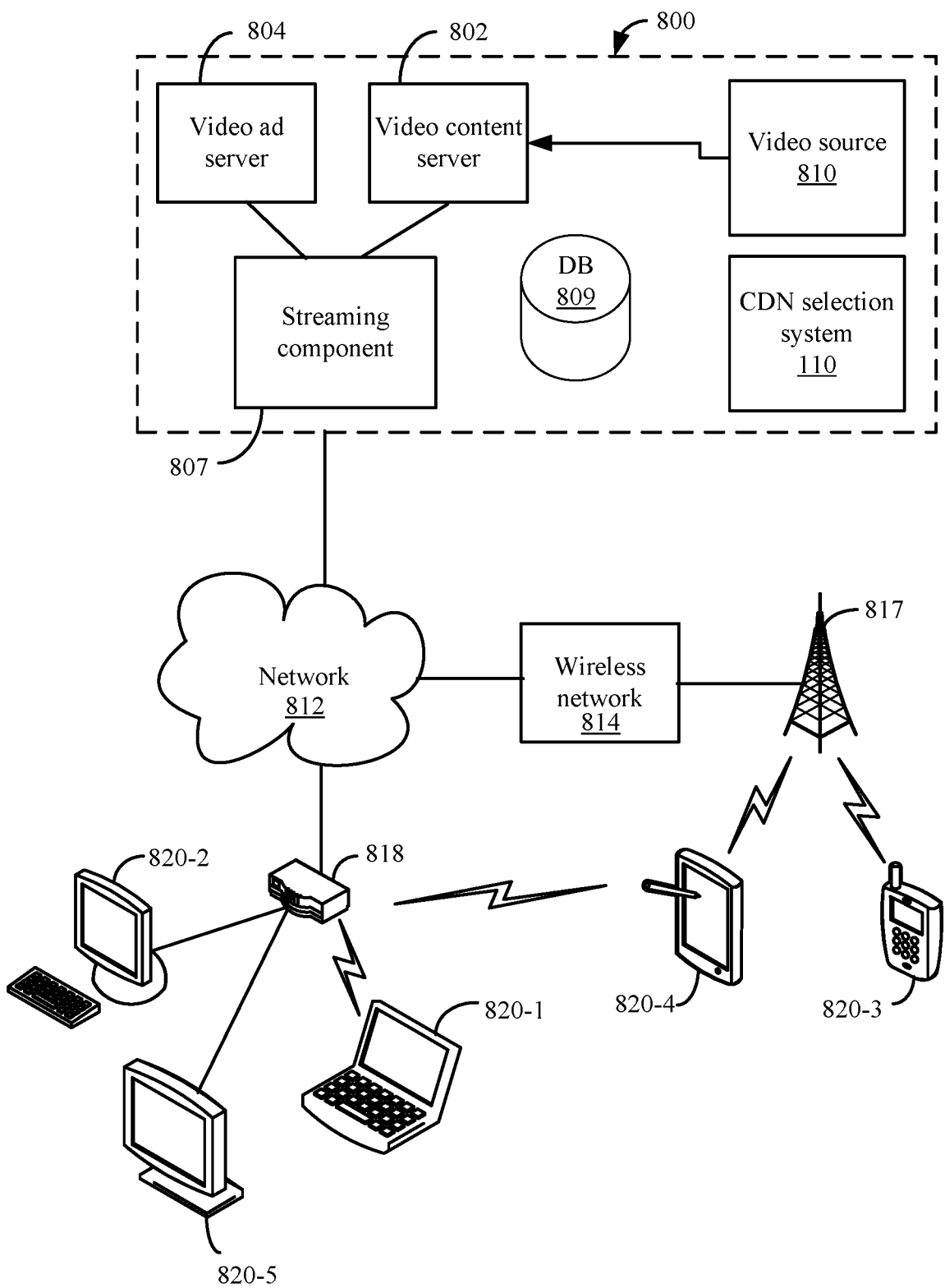
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 800, a public service message, or some other information. The video advertising server 804 may serve the video advertising segments as directed by a user interface controller (not shown).

The video streaming system 800 also may include CDN selection system 110.

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example, administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless network 814 (e.g., a wireless cellular telecommunications network (WCS)), or some combination of these or similar networks.

One or more client devices 820 may be in communication with the video streaming system 800, via the data communication network 812, wireless network 814, or another network. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 817 for wireless network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth, and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HyperText Transfer Protocol (HTTP) and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
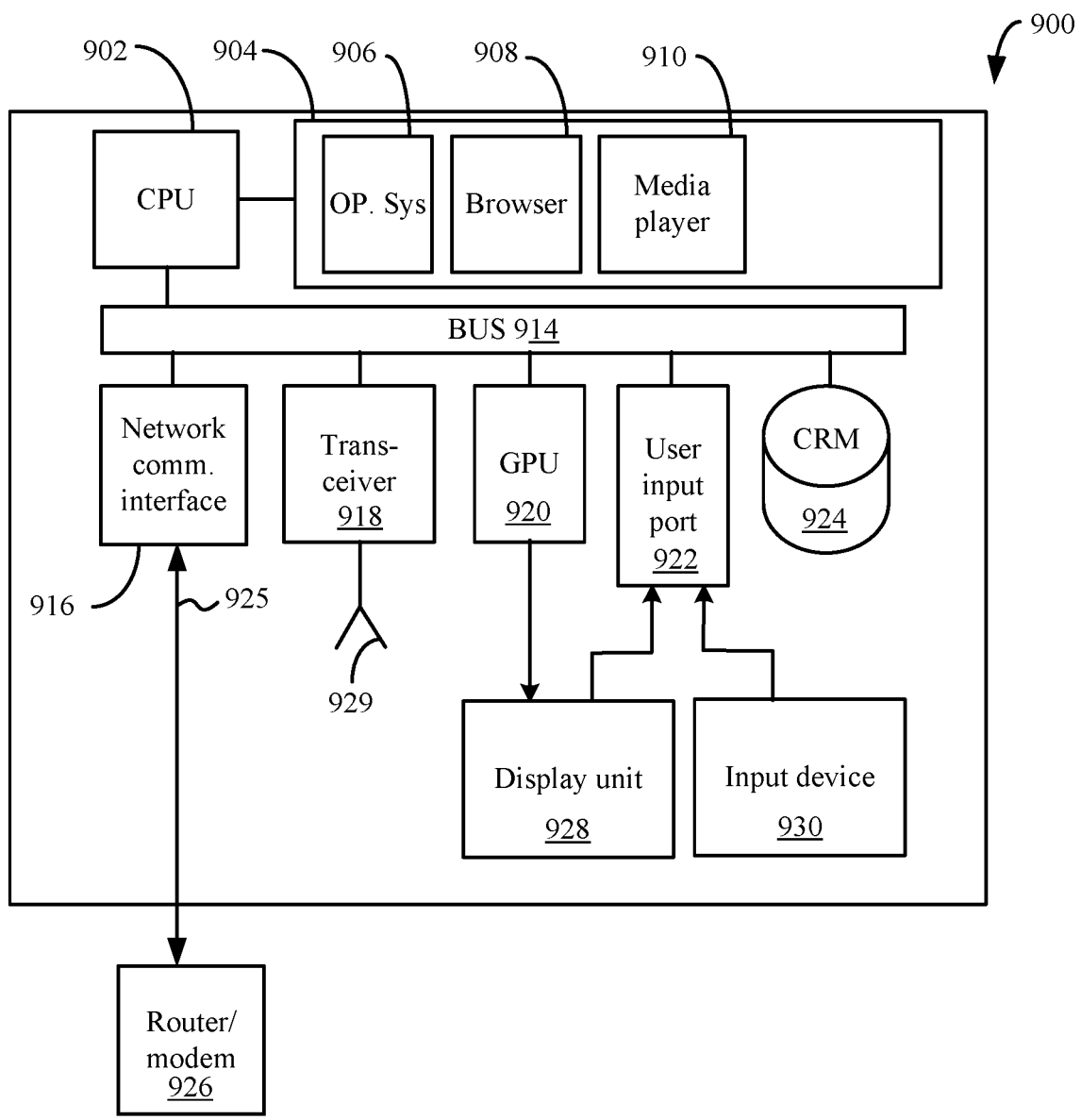
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured or operable to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device (CRM) 924 may store the modules for operating system 906, browser 908, and media player 910 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured or operable to perform one or more operations of a method as described herein.

A network communication (comm.) interface 916 may also be connected to the bus 914. The network communication interface 916 may provide or support two-way data communication between the apparatus 900 and one or more external devices, e.g., the streaming system 800, optionally via a router/modem 926 and a wired or wireless connection 925. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera, or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
    determining, by a computing device, an input value for a request for content;
    retrieving, by the computing device, a plurality of states for a plurality of content delivery networks, wherein a state includes a first parameter and a second parameter based on historical observations of delivery of content for the respective content delivery network;
    generating, by the computing device, a plurality of scores for the plurality of content delivery networks based on the input value and the plurality of states, wherein a score for a content delivery network is generated using a first component that represents an exploitation value from the first parameter and the second parameter, a second component that represents a variance from the first parameter and the second parameter, and the input value;
    selecting, by the computing device, a content delivery network from the plurality of content delivery networks based on the score for the content delivery network; and
    outputting, by the computing device, information for the selected content delivery network to cause the selected content delivery network to service the request to deliver the content.

2. The method of claim 1, wherein generating the plurality of scores comprises:
    generating the score for each content delivery network in the plurality of content delivery networks based on a respective state for the content delivery network and the input value.

3. The method of claim 1, wherein the first parameter decreases as a number of historical observations for a respective content delivery network increases.

4. The method of claim 1, wherein the score is based on a prediction of an upper bound.

5. The method of claim 1, wherein the request for content is received from a client, and content delivery networks in the plurality of content delivery networks are able to deliver the content to the client.

6. The method of claim 1, wherein the input value comprises a set of input values based on a context associated with the request.

7. The method of claim 6, wherein the context is associated with a client that sent the request and receives a delivery of the content.

8. The method of claim 1, wherein generating the plurality of scores comprises:
    using a plurality of agents to generate the plurality of scores, wherein each content delivery network is associated with a respective agent.

9. The method of claim 8, wherein a state is stored for each of the plurality of agents.

10. The method of claim 1, further comprising:
    receiving feedback from a delivery of the content by the selected content delivery network; and
    adjusting the first parameter or the second parameter based on the feedback.

11. The method of claim 10, wherein:
    the feedback is based on a performance metric that is measured based on the delivery of the content by the selected content delivery network.

12. The method of claim 11, wherein the feedback comprises whether a rebuffer occurred during the delivery of the content by the selected content delivery network.

13. The method of claim 12, wherein the first parameter or the second parameter is changed to a value to predict higher scores when no rebuffer occurs.

14. The method of claim 10, wherein adjusting the first parameter or the second parameter is performed in real time when the feedback is received.

15. The method of claim 10, wherein adjusting the first parameter or the second parameter is performed by an operation to adjust the first parameter or the second parameter from a first value to a second value using the feedback.

16. The method of claim 1, wherein selecting the content delivery network comprises:
selecting a highest ranked score from the plurality of scores.

17. The method of claim 1, wherein:
the first parameter represents historical selections of content delivery networks in the plurality of content delivery network; and
the second parameter is based on occurrences for a metric.

18. The method of claim 1, wherein the exploitation value is based on a mean of the first parameter and the second parameter.

19. A non-transitory computer-readable storage medium having stored thereon computer executable instructions, which when executed by a computing device, cause the computing device to be operable for:
determining an input value for a request for content;
retrieving a plurality of states for a plurality of content delivery networks, wherein a state includes a first parameter and a second parameter based on historical observations of delivery of content for the respective content delivery network;
generating a plurality of scores for the plurality of content delivery networks based on the input value and the plurality of states, wherein a score for a content delivery network is generated using a first component that represents an exploitation value from the first parameter and the second parameter, a second component that represents a variance from the first parameter and the second parameter, and the input value;
selecting a content delivery network from the plurality of content delivery networks based on the score for the content delivery network; and
outputting information for the selected content delivery network to cause the selected content delivery network to service the request to deliver the content.

20. An apparatus comprising:
one or more computer processors; and
a computer-readable storage medium comprising instructions for controlling the one or more computer processors to be operable for:
determining an input value for a request for content;
retrieving a plurality of states for a plurality of content delivery networks, wherein a state includes a first parameter and a second parameter based on historical observations of delivery of content for the respective content delivery network;
generating a plurality of scores for the plurality of content delivery networks based on the input value and the plurality of states, wherein a score for a content delivery network is generated using a first component that represents an exploitation value from the first parameter and the second parameter, a second component that represents a variance from the first parameter and the second parameter, and the input value;
selecting a content delivery network from the plurality of content delivery networks based on the score for the content delivery network; and
outputting information for the selected content delivery network to cause the selected content delivery network to service the request to deliver the content.

* * * * *